(12) United States Patent
Lai et al.

(10) Patent No.: US 9,160,639 B2
(45) Date of Patent: Oct. 13, 2015

(54) NETWORK FLOW ABNORMALITY DETECTION SYSTEM AND A METHOD OF THE SAME

(71) Applicant: CHUNG YUAN CHRISTIAN UNIVERSITY, Chung Li (TW)

(72) Inventors: Yu-Kuen Lai, Chung Li (TW); Chun-Chieh Lee, Chung Li (TW); Yi-Chun Liao, Chung Li (TW)

(73) Assignee: Chung Yuan Christian University, Chung Li (TW)

( * ) Notice: Subject to any disclaimer, the term of this patent is extended or adjusted under 35 U.S.C. 154(b) by 429 days.

(21) Appl. No.: 13/762,684

(22) Filed: Feb. 8, 2013

(65) Prior Publication Data

US 2013/0326056 A1      Dec. 5, 2013

(30) Foreign Application Priority Data

May 30, 2012   (TW) ............................. 101119289 A (51) Int. Cl.
*G06F 15/16*         (2006.01)
*H04L 12/26*         (2006.01)
*H04L 29/06*         (2006.01)

(52) U.S. Cl.
CPC .......... *H04L 43/0876* (2013.01); *H04L 43/026* (2013.01); *H04L 43/04* (2013.01); *H04L 63/1425* (2013.01)

(58) Field of Classification Search
None
See application file for complete search history.

(56) References Cited

U.S. PATENT DOCUMENTS

| 6,446,200 | B1* | 9/2002 | Ball et al. .......................... 713/1 |
| 7,167,860 | B1* | 1/2007 | Black et al. ..................... 705/35 |
| 7,751,325 | B2* | 7/2010 | Krishnamurthy et al. .... 370/233 |
| 2003/0043938 | A1* | 3/2003 | Masejnik et al. ............. 375/340 |
| 2013/0212436 | A1* | 8/2013 | Zhu et al. ........................ 714/35 |

* cited by examiner

*Primary Examiner* — Thomas Dailey
(74) *Attorney, Agent, or Firm* — Rosenberg, Klein & Lee (57) ABSTRACT

A network flow abnormality detection system and method for detecting at least one network packet to determine whether a flow condition of the network packet is abnormal. The network packet includes L bit data element values. The method is fetching M data element values in above-mentioned L bit data element values by data element value fetch unit, wherein M is an odd number and larger than 1; N parallel processing units receive and process above-mentioned M data element values; comparison module compares above-mentioned M data element values and a standard threshold to generate M comparison result values; sum unit sums above-mentioned M comparison result values to obtain a comparison sum value; determination unit compares the comparison sum value and an abnormality threshold, wherein when the comparison sum value is larger than the abnormality threshold, the determination unit determines the flow condition is abnormal.

13 Claims, 7 Drawing Sheets

| Processor SPEC | Execution Time |
|---|---|
| 400MHz SGI R12K | 2.69 s |
| 900MHz SUN Ultrasparc-III | 1.46 s |
| 500MHz Storm-1™ SP16-G160 | 0.99 ms |

| Processor SPEC | Execution Time |
|---|---|
| 400MHz SGI R12K | 89 ms |
| 900MHz SUN Ultrasparc-III | 34 ms |
| 500MHz Storm-1™ SP16-G160 | 18 ms |

NETWORK FLOW ABNORMALITY DETECTION SYSTEM AND A METHOD OF THE SAME

This application claims the benefits of the Taiwan Patent Application Serial NO. 101119289 filed on May 30, 2012, the subject matter of which is incorporated herein by reference.

BACKGROUND OF THE INVENTION

1. Field of the Invention

The present invention relates to a network flow abnormality detection system and a method thereof, more particularly, relates to a system and method for network flow change detection by analyzing packet header efficiently on a multi-core processor.

2. Description of the Prior Art

Analyzing a network flow is very important when it comes to modern network system security. By monitoring, collecting and analyzing every piece of information of flow in a network system, abnormalities occurred in network can be detected. The reason for detecting abnormalities in network flow is to detect packet flow which changes very suddenly. By analyzing the information with other techniques for intrusion detection, potential security leak, unfriendly attack and abnormality can be found.

Due to the development of Internet and rapid growth of bandwidth, data volume per unit time also increases. Besides, since network system is more complex, a detection system with single monitoring spot can no longer provide complete network information—more monitoring spots are needed for the detection of network flow. A single-core CPU is reaching its processing limits due to the rapid growth of Internet traffic, therefore, multi-core processors are utilized to provide better capability in network system design. As a result, since a graphic processing unit is multi cored, it is applied to fields other than graphic operations such as common computing so that the loading of the original CPU is dispersed. A multi core processing unit provides extraordinary parallel computing and has larger bandwidth of accessing memories; thus it is applied to network system for processing data-parallel network applications.

Neelam Goyal and Randy Smith (referring to R. Smith, N. Goyal, J. Ormont, K. Sankaralingam, C. Estan. Evaluating GPUs for network packet signature matching. Performance Analysis of Systems and Software, 2009 ISPASS 2009. IEEE Inter-national symposium on, strony 175-184, 2009) disclosed the utility of GPU SIMD for detecting network abnormalities by using NVIDIA GeForce 8 Series (G80) as an accelerating core for sting matching. NVIDIA GT280 GPU provides the operation capability of 933GFLOPS (Giga Floating point Operations per second) and accessing speed of 141.7 GB/s of memories for 240 stream processors according to Shuai Mu el. so as to process a search of routing table and realize a function of string matching by the algorithm of Bloom filter and Aho-Corisick.

Further, Sangjin Han and Keon Jang (referring to R. Smith, N. Goyal, J. Ormont, K. Sankaralingam, C. Estan. Evaluating GPUs for network packet signature matching. Performance Analysis of Systems and Software, 2009 ISPASS 2009. IEEE Inter-national symposium on, strony 175-184, 2009) disclosed PacketShader software router, wherein NVIDIA GTX480 GPU is utilized as the accelerator for searching an IP router. NVIDIA GTX480 GPU provides the operation capability and accessing speed of 177.4 GB/s of memories for 480 stream processors so that the speed of PacketShader reached 40 Gbps. From the above, the GPU is utilized for increasing the performance of processing according to basic architecture of stream processor.

According to "Method and Apparatus for Sketch-based Detection of Changes in Network Traffic", B. Krishnamurthy el., U.S. Pat. No. 7,751,325, the K-ary Sketch structure is applied to multi core processing chips for summaries and calculations of data according to network packet flow via multiple hashing functions with errors generated by hashing collisions. The K-ary Sketch is further applied in the operations of microprocessors of SUN UltraSparc-III and SGI R12k. The operation time thereof is 2.69 seconds and 1.46 seconds respectively (hashing function=5, space parameter=64 k, source IP address=1,000,000).

However, according to the K-ary sketch structure, 4-universal hash functions are used to query an error array. The query results are then sorted in order to obtain the median value. The sorting process requires significant CPU processing cycles; moreover, the time is in proportional with the number of incoming packet.

Therefore, it is crucial to minimize the time of sorting process with the technique presented in this document on a parallel processor for network system design.

SUMMARY OF THE INVENTION

In the prior art, there are chances that the processing time is delayed because present network detection system sorts the data by obtaining the median number and thus the performance is lowered.

Therefore, a network flow abnormality detection system and a method thereof are provided; fetching a plurality of data element values in packets flow by a data element value fetch unit; the data element values are dispersed into parallel processing units; the data element values and a standard threshold are compared to generate a plurality of comparison result values; a sum unit sums the comparison result values to obtain a comparison sum value; the comparison sum value is compared with an abnormality threshold so as to detect the network flow.

A network flow abnormality detection system is provided for detecting at least one network packet to determine whether a flow condition of the network packet is abnormal, the network packet including L bit data element values, the system including a data element value fetch unit, N parallel processing units, a sum unit and a determination unit.

The data element value fetch unit fetches M data element values in the L bit data element values, wherein M is an odd number and larger than 1.

The N parallel processing units receives and processes the M data element values, each parallel processing unit including a comparison module electrically connecting the data element value fetch unit, the comparison module being installed with a standard threshold, wherein according to an embodiment of the present invention, each parallel processing unit further includes a temporary storage unit and a D-type flip flop; the temporary storage unit temporarily stores the M data element values and electrically connects the data element value fetch unit; the D-type flip flop installed between the temporary storage unit and the comparison module and electrically connecting the temporary storage unit and the comparison module, the D-type flip flop receiving and memorizing the M data element values and sending the M data element values to the comparison module; the temporary storage unit including a random access memory, the temporary storage unit temporarily storing the M data element values and electrically connecting the data element value fetch unit; the comparison module including an arithmetic logic unit.

The sum unit electrically connects the N parallel processing units, the determination unit electrically connecting the sum unit and installed with an abnormality threshold, wherein according to an embodiment of the present invention, the M data element values being multiplied by ½.

The M data element values is spread among the comparison modules of the N parallel processing units to be compared with the standard threshold to generate M comparison result values; the sum unit sums the M comparison result values to obtain a comparison sum value; the determination unit compares the comparison sum value and the abnormality threshold; when the comparison sum value is larger than the abnormality threshold, the determination unit determines the flow condition is abnormal.

Further, when one of the M data element values is larger than or equal to the standard threshold, one of the M comparison result values corresponding to the M data element value is 1; when one of the M data element values is smaller than the standard threshold, one of the M comparison result values corresponding to the M data element value is 0.

A network flow abnormality detection method is provided for detecting at least one network packet to determine whether a flow condition of the network packet is abnormal, the network packet including L bit data element values, the method including following steps:

(a) fetching M data element values in the L bit data element values, wherein M is an odd number and larger than 1;
(b) spreading the M data element values to N parallel processing units;
(c) comparing the M data element values and a standard threshold to generate M comparison result values;
(d) summing the M comparison result values to obtain a comparison sum value; and
(e) comparing the comparison sum value and an abnormality threshold to determine the flow condition, wherein when the comparison sum value is larger than the abnormality threshold, the flow condition is determined as abnormal.

Preferably, the M data element values are fetched by a data element value fetch unit and received and processed by the N parallel processing units, each N parallel processing units including a comparison module. The comparison module includes an arithmetic logic unit; the comparison module electrically connects the data element value fetch unit, is installed with a standard threshold and carrying out step (c). Step (d) is carried out by a sum unit electrically connecting the N parallel processing units. Step (e) is carried out by a determination unit electrically connecting the sum unit and the determination unit is installed with the abnormality threshold. The abnormality threshold includes the M data element values being multiplied by ½.

Moreover, each parallel processing unit further includes a D-type flip flop installed between the temporary storage unit and the comparison module, the D-type flip flop electrically connecting the temporary storage unit and the comparison module, the D-type flip flop receiving and memorizing the M data element values and sending the M data element values to the comparison module, wherein when one of the M data element values is larger than or equal to the standard threshold, one of the M comparison result values corresponding to the M data element value is 1; when one of the M data element values is smaller than the standard threshold, one of the M comparison result values corresponding to the M data element value is 0.

In the prior art, there are chances that the processing time is delayed because present network detection system sorts the data by obtaining the median number and thus the performance is lowered.

Therefore, a network flow abnormality detection system and a method thereof are provided; fetching an odd plurality (e.g. 3, 5, 7, etc.) of data element values in packets flow by a data element value fetch unit; the data element values are dispersed into parallel processing units; the data element values and a standard threshold are compared to generate an odd plurality (e.g. 3, 5, 7, etc.) of comparison result values; a sum unit sums the comparison result values to obtain a comparison sum value; the comparison sum value is compared with an abnormality threshold so as to detect the network flow. Since it is not necessary to sort data and obtain median number according to the present invention, the performance is highly improved and thus the processing speed of a multi core processing chip is increased.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

The present invention relates to a network flow abnormality detection system and a method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
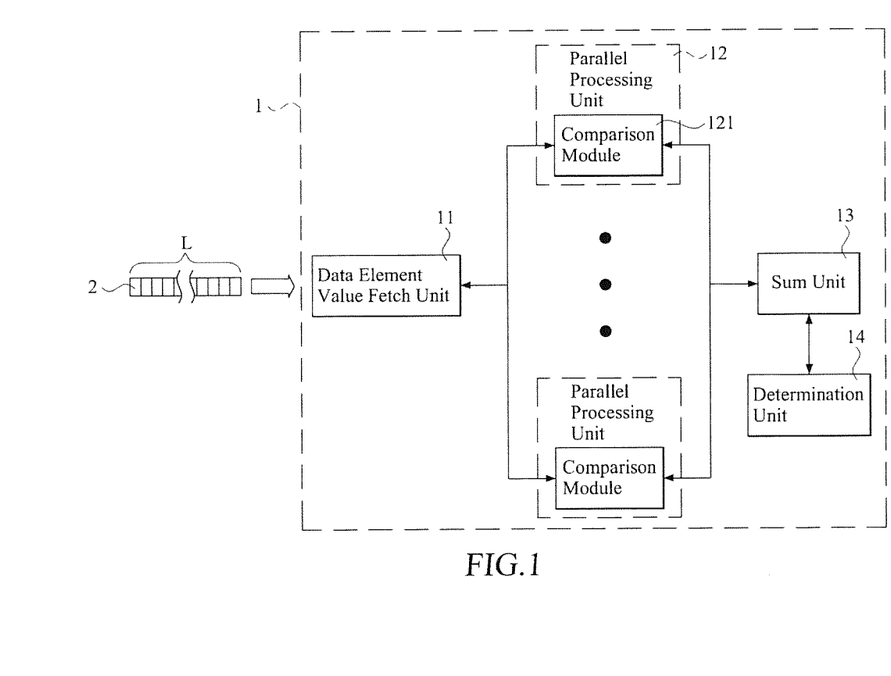
FIG. 1 is a schematic drawing of a network flow abnormality detection system according to a first embodiment of the present invention.

Refer to FIG. 1, a schematic drawing of a network flow abnormality detection system according to a first embodiment of the present invention. A network flow abnormality detection system 1 detects at least one network packet 2 to determine whether a flow condition of the network packet 2 is abnormal, the network packet 2 including L bit data element values, the L bit data element values is selected from the group of 32 bits and 64 bits. The network flow abnormality detection system 1 includes a data element value fetch unit 11, N parallel processing units 12 (according to the first embodiment of the present invention, N=16, only one parallel processing unit is identified with referential number in the figure, but it is not limited by the embodiment. i.e. N is selected from the group of 16, 32, etc.), a sum unit 13 and a determination unit 14.

The data element value fetch unit 11 fetches M data element values in the L bit data element values. More particularly, when fetching the M data element values, a flow mark (e.g. header) of the network packet 2 is fetched and the L bit data element values are calculated by M hash functions so as to obtain the M data element values, wherein M is an odd number and larger than 1. That is M=3, 5, 7, 9, etc.

The N parallel processing units 12 receives and processes the M data element values, each parallel processing unit 12 including a comparison module 121 electrically connecting the data element value fetch unit 11, the comparison module 121 being installed with a standard threshold and the comparison module 121 including an arithmetic logic unit.

The sum unit 13 electrically connects the 16 parallel processing units 12 (only two parallel processing units illustrated in the figure). The determination unit 14 electrically connects the sum unit 13 and is installed with an abnormality threshold.

The M data element values is spread among the comparison modules 121 of the 16 parallel processing units 12 to be compared with the standard threshold to generate M comparison result values; when one of the M data element values is larger than or equal to the standard threshold, the one of the M comparison result values corresponding to the M data element value is 1, when one of the M data element value is smaller than the standard threshold, the one of the M comparison result values corresponding to the M data element value is 0. More particularly, each data element value is compared with the standard threshold to generate a corresponding result. When the data element value is larger than or equal to the standard threshold, the comparison module 121 sets the comparison result value to be 1; when the data element value is smaller than the standard threshold, the comparison module 121 sets the comparison result value to be 0.

The sum unit 13 sums the M comparison result values to obtain a comparison sum value. More particularly, the sum unit 13 sums the above-mentioned comparison result value of 1 or 0 so as to obtain the comparison sum value. It is worth mentioned that the sum unit 13 obtains the comparison sum value by calculating the number of the comparison result value=1; that is, if there are 16 comparison result values=1, then the comparison sum value=16. The determination unit 14 compares the comparison sum value and the abnormality threshold; when the comparison sum value is larger than the abnormality threshold, the determination unit 14 determines the flow condition is abnormal. More particularly, the determination unit 14 determines the flow condition of the flow mark of the network packet 2 to be abnormal. The abnormality threshold includes the M data element values being multiplied by ½, i.e. M/2. More particularly, according to the first embodiment of the present invention, when the comparison sum value is larger than or equal to M/2, the flow condition is abnormal.

Figure 2:
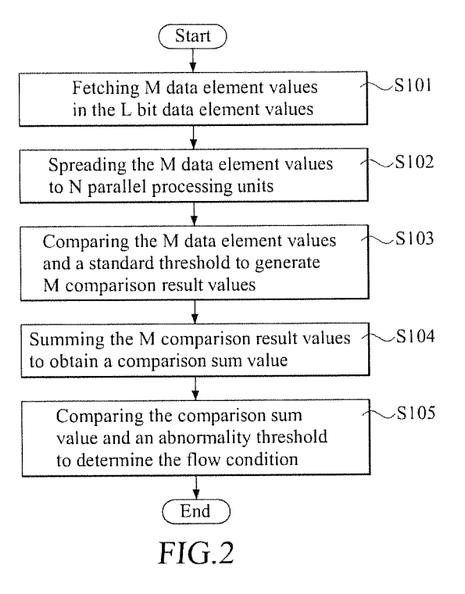
FIG. 2 is a flow chart of a network flow abnormality detection method according to an embodiment of the present invention.

Refer to FIG. 1 and FIG. 2. FIG. 2 is a flow chart of a network flow abnormality detection method according to an embodiment of the present invention. The method illustrated in FIG. 2 is according to the system of the first embodiment shown in FIG. 1; thus, a description of the system is not mentioned again. The method is for detecting at least one network packet 2 to determine whether a flow condition of the network packet 2 is abnormal, the network packet 2 including L bit data element values, the L bit data element values is selected from the group of 32 bits and 64 bits; the method including following steps:

S101: fetching M data element values in the L bit data element values;

S102: spreading the M data element values to N parallel processing units 12;

S103: comparing the M data element values and a standard threshold to generate M comparison result values;

S104: summing the M comparison result values to obtain a comparison sum value; and S105: comparing the comparison sum value and an abnormality threshold to determine the flow condition.

In S101, a data element value fetch unit 11 fetches M data element values in the L bit data element values. More particularly, when fetching the M data element values, a flow mark (e.g. header) of the network packet 2 is fetched and the L bit data element values are calculated by M hash functions so as to obtain the M data element values.

In S102, the N parallel processing units 12 receives and processes the M data element values (according to the first embodiment of the present invention, N=16, but it is not limited by the embodiment. i.e. N is selected from the group of 16, 32, etc.)

According to the first embodiment of the present invention, S103 is carried out by the comparison modules 121. When one of the M data element values is larger than or equal to the standard threshold, the one of the M comparison result values corresponding to the M data element value is 1, when one of the M data element value is smaller than the standard threshold, the one of the M comparison result values corresponding to the M data element value is 0. More particularly, each data element value is compared with the standard threshold to generate a corresponding result. When the data element value is larger than or equal to the standard threshold, the comparison module 121 sets the comparison result value to be 1; when the data element value is smaller than the standard threshold, the comparison module 121 sets the comparison result value to be 0.

According to the first embodiment of the present invention, S104 is carried out by the sum unit 13. More particularly, the sum unit 13 sums the comparison result value of 1 or 0 generated in S103 so as to obtain the comparison sum value. It is worth mentioned that the sum unit 13 obtains the comparison sum value by calculating the number of the comparison result value=1; that is, if there are 17 comparison result values=1, then the comparison sum value=17.

According to the first embodiment of the present invention, S105 is carried out by the determination unit 14. When the comparison sum value is larger than the abnormality threshold, the determination unit 14 determines the flow condition is abnormal. More particularly, the determination unit 14 determines the flow condition of the flow mark of the network packet 2 to be abnormal. The abnormality threshold includes the M data element values being multiplied by ½, i.e. M/2. More particularly, according to the first embodiment of the present invention, when the comparison sum value is larger than or equal to M/2, the flow condition is abnormal. Furthermore, in other embodiment of the present invention, a source address from which abnormal flows come is listed so that a network manager can further check the condition of the source address. It is worth mentioned that the settlement of the abnormality threshold in FIGS. 1 and 2 includes the M data element values plus 1 and then multiplied by ½; that is, (M+1)/2. The settlement various from different multi core processing chips.

In other embodiments of the present invention, a large amount of network packets 2 exist in the flow of source address; therefore, in S101, flow marks (e.g. headers) of K network packets 2 are fetched and the L bit data element values are calculated by hash functions so as to obtain the M×K data element values. The L bit data element values include key values and in S103, S104 and S105, a variance array is compared with the standard threshold to obtain a comparison value array. More particularly, M×K comparison result values are obtained to form a comparison value array which represents which data element value in the variance array is larger than the standard threshold. When the data element value is larger than the standard threshold, the value of the comparison value array is set to be 1; when the data element value is smaller than the standard threshold, the value of the comparison value array is set to be 0. The values of the comparison value array are summed up (S104: summing the comparison result values). More particularly, the M comparison result values of the flow marks of the network packets are summed up to obtain the comparison sum value; if the comparison sum value is larger than the ½ number of the hash functions, the flow condition is determined abnormal. Since the median number of the key values (i.e. the L bit data element value) must be larger than the standard threshold, it is not necessary to sort data and obtain median number according to the present invention, so the performance is highly improved.

According to an embodiment of the present invention, K=1. Please refer to following codes:

```
for i=1 to L {
    for j=1 to H {
        if(Sketch_Array[j][HASHj(key_array)[i])]>threshold)
            sum=sum+1;
    }
    if sum>(H/2)
        push key_array[i]to Alarm_list
}
```

The codes are revised from the algorithm of K-ary Sketch for detecting abnormal flow conditions according to B. Krishnamurthy el. "Method and Apparatus for Sketch-based Detection of Changes in Network Traffic."

Figure 3:
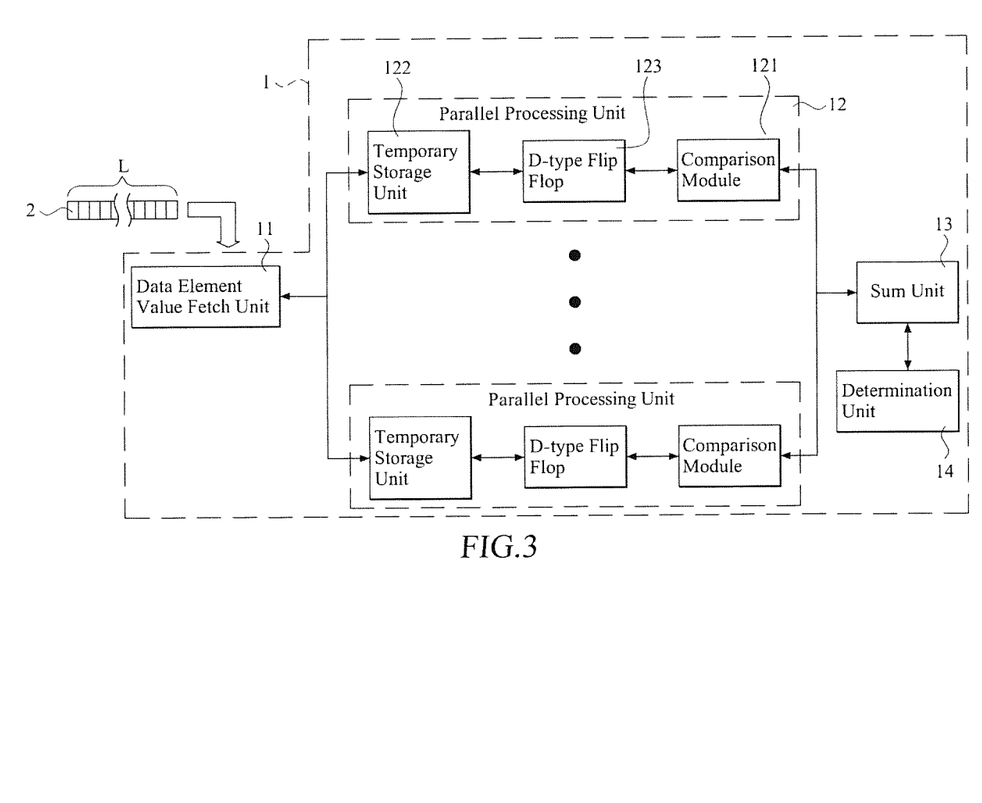
FIG. 3 is a schematic drawing of a network flow abnormality detection system according to a second embodiment of the present invention.

Refer to FIG. 3, a schematic drawing of a network flow abnormality detection system according to a second embodiment of the present invention. According to FIG. 3, compared with FIG. 1, each of 16 parallel processing units 12 (only two parallel processing units are illustrated and only one is identified with a referential number) includes a temporary storage unit 122 and a D-type flip flop 123. The temporary storage unit 122 temporarily stores the M data element values and electrically connects a data element value fetch unit 11; the temporary storage unit 122 including a random access memory. The D-type flip flop 123 electrically connects the temporary storage unit 122 and a comparison module 121, the D-type flip flop 123 receiving and memorizing the M data element values and sending the M data element values to the comparison module 121.

Moreover, compared with the first embodiment of the present invention, when applying the second embodiment of the present invention to a network flow abnormality detection method, the M data element values are temporarily stored and memorized between S102 and S 103. Other steps in the second embodiment of the present invention are the same with those in the first embodiment and thus are not mentioned again.

Figure 4:
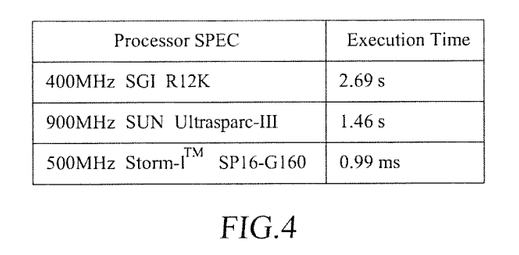
FIG. 4 is a comparison table showing an embodiment of the present invention being utilized in Storm-1 stream processor.

Refer to FIG. 4, a comparison table showing an embodiment of the present invention being utilized in Storm-1 stream processor. According to B. Krishnamurthy el., the K-ary Sketch is applied in the operations of microprocessors of SUN UltraSparc-III and SGI R12k. The operation time thereof is 2.69 seconds and 1.46 seconds respectively (hashing function=5, space parameter=64 k, source IP address=1,000,000; referring to U.S. Pat. No. 7,751,325). According to the embodiment of the present invention being utilized in Storm-1 stream processor, as shown in FIG. 4, only 0.99 milliseconds is required. It is obvious that the performance is greatly improved.

Figure 5:
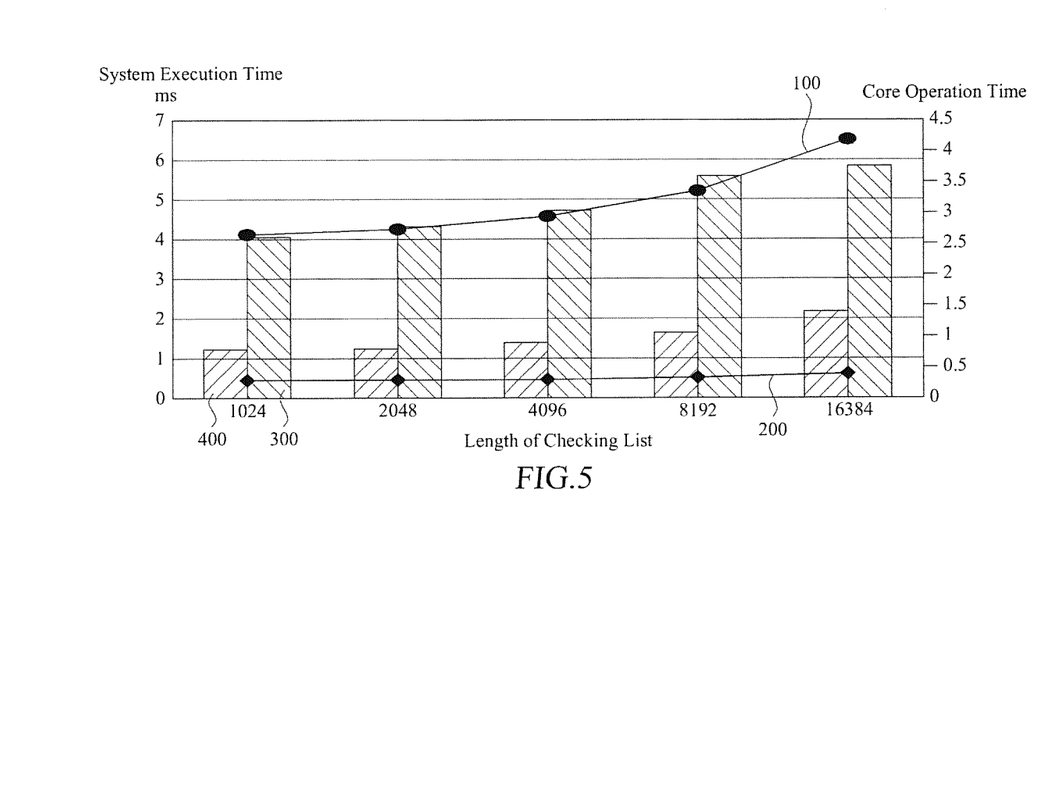
FIG. 5 is a diagram showing execution time of an embodiment of the present invention being utilized in Storm-1 stream processor.

Refer to FIG. 5, a diagram showing execution time of an embodiment of the present invention being utilized in Storm-1 stream processor. Comparison conditions are: the number of hash functions to be 4 and the size of entry to be 4K. Comparing B. Krishnamurthy el. and an embodiment of the present invention, Curve 100 is the core operation time of system according to B. Krishnamurthy el.; Curve 200 is the core operation time of system according to an embodiment of the present invention; Block 300 is the system execution time according to B. Krishnamurthy el.; Block 400 is the system execution time according to the embodiment of the present invention. It is obvious that total system execution time for checking individual from different source addresses is shortened by 30%-40% and the core execution speed is increased by 10 times according to the embodiment of the present invention.

Figure 6:
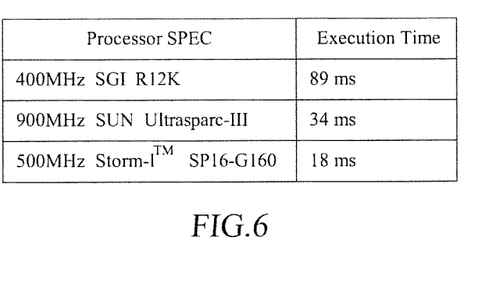
FIG. 6 is a comparison table showing an embodiment of the present invention being utilized in Storm-1 stream processor.

Refer to FIG. 6, a comparison table showing an embodiment of the present invention being utilized in Storm-1 stream processor. According to other paper from B. Krishnamurthy el. (referring to Balachander Krishnamurthy, Subhabreta Sen, Yin Zhang, and Yan Chen. Sketch-based change detection: methods, evaluation, and applications. In Proceedings of the 3rd ACM SIGCOMM conference on Internet measurement, pages 234-247, Miami Beach, Fla., USA, 2003.ACM), the K-ary Sketch is applied in the operations of microprocessors of SUN UltraSparc-III and SGI R12k for abnormal flow detection and simulation; the operation time for operating 10 million 4-universal hash functions is 34 milliseconds and 89 milliseconds respectively. According to the embodiment of the present invention being utilized in Storm-1 stream processor, as shown in FIG. 6, only 18 milliseconds is required. It is obvious that shorter time is needed for operating hash functions according to the embodiment of the present invention.

Figure 7:
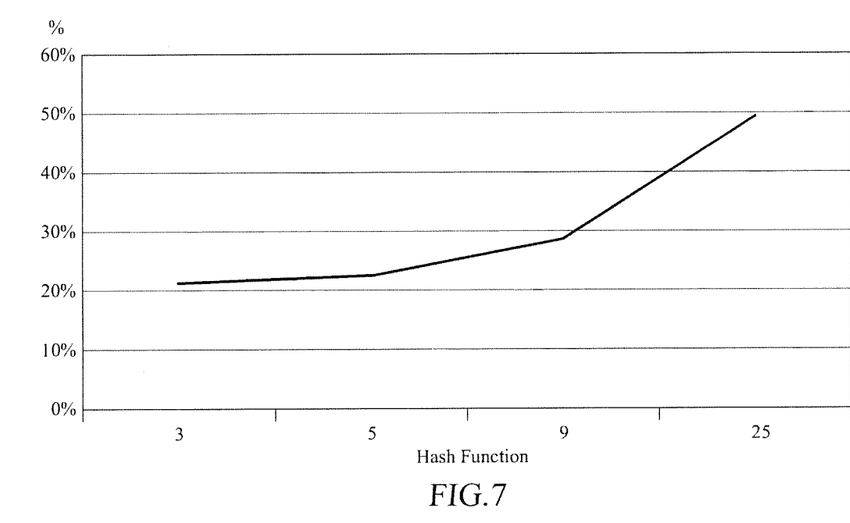
FIG. 7 is a diagram showing performance of an embodiment of the present invention being utilized in Storm-1 stream processor when executing hash function.

Refer to FIG. 7, a diagram showing performance of an embodiment of the present invention being utilized in Storm-1 stream processor when executing hash function. Under the condition of executing 25 hash functions, the embodiment of the present invention decreases the counts of commands for operation by 49% and greatly improves the performance.

In conclusion, by determining whether the comparison sum value is larger than ½ M data element values and since the median number thereof must be larger than the standard threshold, it is not necessary to sort data and obtain median number according to embodiments of the present invention, so the performance is highly improved.

While the present invention has been particularly shown and described with reference to a preferred embodiment, it will be understood by those skilled in the art that various changes in form and detail may be without departing from the spirit and scope of the present invention.

What is claimed is:

1. A network flow abnormality detection system, detecting at least one network packet to determine whether a flow condition of the network packet is abnormal, the network packet including L bit data element values, the system comprising:

a data element value fetch unit, fetching M data element values in the L bit data element values, wherein M is an odd number and larger than 1;

N parallel processing units, receiving and processing the M data element values, each parallel processing unit including:

a comparison module, electrically connecting the data element value fetch unit, the comparison module being installed with a standard threshold;

a sum unit, electrically connecting the N parallel processing units; and a determination unit, electrically connecting the sum unit, the determination unit being installed with an abnormality threshold;

wherein the M data element values is spread among the comparison modules of the N parallel processing units to be compared with the standard threshold to generate M comparison result values; the sum unit sums the M comparison result values to obtain a comparison sum value; the determination unit compares the comparison sum value and the abnormality threshold; when the comparison sum value is larger than the abnormality threshold, the determination unit determines the flow condition is abnormal.

2. The system according to claim 1, wherein the abnormality threshold includes the M data element values being multiplied by ½.

3. The system according to claim 1, wherein each parallel processing unit further includes a temporary storage unit for temporarily storing the M data element values, the temporary storage unit electrically connecting the data element value fetch unit.

4. The system according to claim 3, wherein the temporary storage unit includes a random access memory.

5. The system according to claim 3, wherein each parallel processing unit further includes a D-type flip flop installed between the temporary storage unit and the comparison module, the D-type flip flop electrically connecting the temporary storage unit and the comparison module, the D-type flip flop receiving and memorizing the M data element values and sending the M data element values to the comparison module.

6. The system according to claim 1, wherein when one of the M data element values is larger than or equal to the standard threshold, one of the M comparison result values corresponding to the M data element value is 1; when one of the M data element values is smaller than the standard threshold, one of the M comparison result values corresponding to the M data element value is 0.

7. The system according to claim 1, wherein the comparison module includes an arithmetic logic unit.

8. A network flow abnormality detection method, detecting at least one network packet to determine whether a flow condition of the network packet is abnormal, the network packet including L bit data element values, the method comprising following steps:

(a) fetching M data element values in the L bit data element values, wherein M is an odd number and larger than 1;

(b) spreading the M data element values to N parallel processing units;

(c) comparing the M data element values and a standard threshold to generate M comparison result values;

(d) summing the M comparison result values to obtain a comparison sum value; and (e) comparing the comparison sum value and an abnormality threshold to determine the flow condition;

wherein when the comparison sum value is larger than the abnormality threshold, the flow condition is determined as abnormal;

the M data element values are fetched by a data element value fetch unit; and the M data element values are received and processed by the N parallel processing units, each N parallel processing units including a comparison module.

9. The method according to claim 8, wherein the comparison module is installed with a standard threshold and the step (c) is carried out by the comparison module.

10. The method according to claim 8, wherein the comparison module includes an arithmetic logic unit.

11. A network flow abnormality detection method, detecting at least one network packet to determine whether a flow condition of the network packet is abnormal, the network packet including L bit data element values, the method comprising following steps:

(a) fetching M data element values in the L bit data element values, wherein M is an odd number and larger than 1;

(b) spreading the M data element values to N parallel processing units;

(c) comparing the M data element values and a standard threshold to generate M comparison result values;

(d) summing the M comparison result values to obtain a comparison sum value; and (e) comparing the comparison sum value and an abnormality threshold to determine the flow condition;

wherein when the comparison sum value is larger than the abnormality threshold, the flow condition is determined as abnormal; the M data element values are fetched by a data element value fetch unit; and each parallel processing unit further includes a temporary storage unit for temporarily storing the M data element values, the temporary storage unit electrically connecting the data element value fetch unit.

12. The method according to claim 11, wherein the temporary storage unit includes a random access memory.

13. The method according to claim 11, wherein each parallel processing unit further includes a D-type flip flop installed between the temporary storage unit and the comparison module, the D-type flip flop electrically connecting the temporary storage unit and the comparison module, the D-type flip flop receiving and memorizing the M data element values and sending the M data elements values to the comparison module.

* * * * *